United States Patent
Drolen et al.

(10) Patent No.: US 10,696,429 B2
(45) Date of Patent: Jun. 30, 2020

(54) DUAL CONDENSER LOOP HEAT PIPE FOR SATELLITES WITH SUN-NORMAL RADIATORS

(71) Applicant: THE BOEING COMPANY, Chicago, IL (US)

(72) Inventors: Bruce L. Drolen, Chicago, IL (US); Jason D. Flathom, Chicago, IL (US); Jonathan M. Allison, Chicago, IL (US); Aimen E. Shawki, Chicago, IL (US)

(73) Assignee: The Boeing Company, Chicago, IL (US)

( * ) Notice: Subject to any disclaimer, the term of this patent is extended or adjusted under 35 U.S.C. 154(b) by 504 days.

(21) Appl. No.: 15/424,599

(22) Filed: Feb. 3, 2017

(65) Prior Publication Data

US 2018/0222605 A1    Aug. 9, 2018

(51) Int. Cl.
    *B64G 1/50*     (2006.01)
    *F28D 15/02*    (2006.01)
    *F28D 21/00*    (2006.01)

(52) U.S. Cl.
    CPC .......... *B64G 1/503* (2013.01); *B64G 1/506* (2013.01); *F28D 15/0241* (2013.01); *F28D 15/0275* (2013.01); *F28D 2021/0021* (2013.01)

(58) Field of Classification Search
    CPC .................... B64G 1/503; B64G 1/506
    See application file for complete search history.

(56) References Cited

U.S. PATENT DOCUMENTS

| 5,957,408 A | 9/1999 | Hall et al. |
| 8,967,547 B2 | 3/2015 | Wong et al. |
| 2002/0139512 A1 | 10/2002 | Low et al. |

(Continued)

FOREIGN PATENT DOCUMENTS

| DE | 2933088 A1 | 2/1981 |
| EP | 1468911 A1 | 10/2004 |
| WO | 2014/197695 A1 | 12/2014 |

OTHER PUBLICATIONS

Anderson, William G. et al., Performance of COMMx Loop Heat Pipe on TacSat 4 Spacecraft, 24th Spacecraft Thermal Control Workshop, El Segundo, CA, Mar. 25-28, 2013, Bill.Anderson@1-ACT.com, Advanced Cooling Technologies, Inc., ISO9001-2008 & AS9100-2009 Certified (9pages).

(Continued)

*Primary Examiner* — Nicholas McFall
(74) *Attorney, Agent, or Firm* — Haynes and Boone LLP

(57) ABSTRACT

Systems, methods, and apparatus for dual condenser loop heat pipes for satellites with sun-normal radiators are disclosed. In one or more embodiments, a disclosed method for a satellite thermal management system comprises heating, in an evaporator, a liquid to convert the liquid to a vapor. The method further comprises passively circulating within tubing, from the evaporator, the vapor to a first radiator not illuminated by a sun and to a second radiator illuminated by the sun. Also, the method comprises converting the vapor to the liquid when the vapor is within the first radiator not illuminated by the sun. Further, the method comprises passively circulating within the tubing, from the first radiator not illuminated by the sun, the liquid to the evaporator.

20 Claims, 12 Drawing Sheets

(56) References Cited

U.S. PATENT DOCUMENTS

| | | | |
|---|---|---|---|
| 2004/0232284 A1* | 11/2004 | Tjiptahardja | B64G 1/503 244/171.8 |
| 2011/0088874 A1* | 4/2011 | Meyer, IV | F28D 15/046 165/104.26 |
| 2013/0200221 A1 | 8/2013 | Goodzeit et al. | |
| 2014/0224939 A1 | 8/2014 | Wong et al. | |

OTHER PUBLICATIONS

Baldauff, Robert W., COMMx LHP Flight Performance, Code 8221—Thermal Systems and Analysis Section, U.S. Naval Research Laboratory, Washington, D.C., Aerospace Corporation, Spacecraft Thermal Control Workshop, Mar. 26-28, 2013 (25pages).

Khrustalev, Dmitry, Advances in Transient Modeling of Loop Heat Pipe Systems with Multiple Components, CP128, Space, Propulsion & Energy Sciences International Forum-SPESIF-2010, edited by G.A. Robertson, 2010, American Institute of Physics 978-0-7354-0749-7/10 (13pages).

Khrustalev, Dmitry et al., Thermal-Vacuum Test Data for Jem/Maxi Loop Heat Pipe System with Two Radiators, 2008 SAE International (7pages).

Extended European Search Report; EP Application No. 17204955.3 dated Jul. 4, 2018; 8 pages.

* cited by examiner

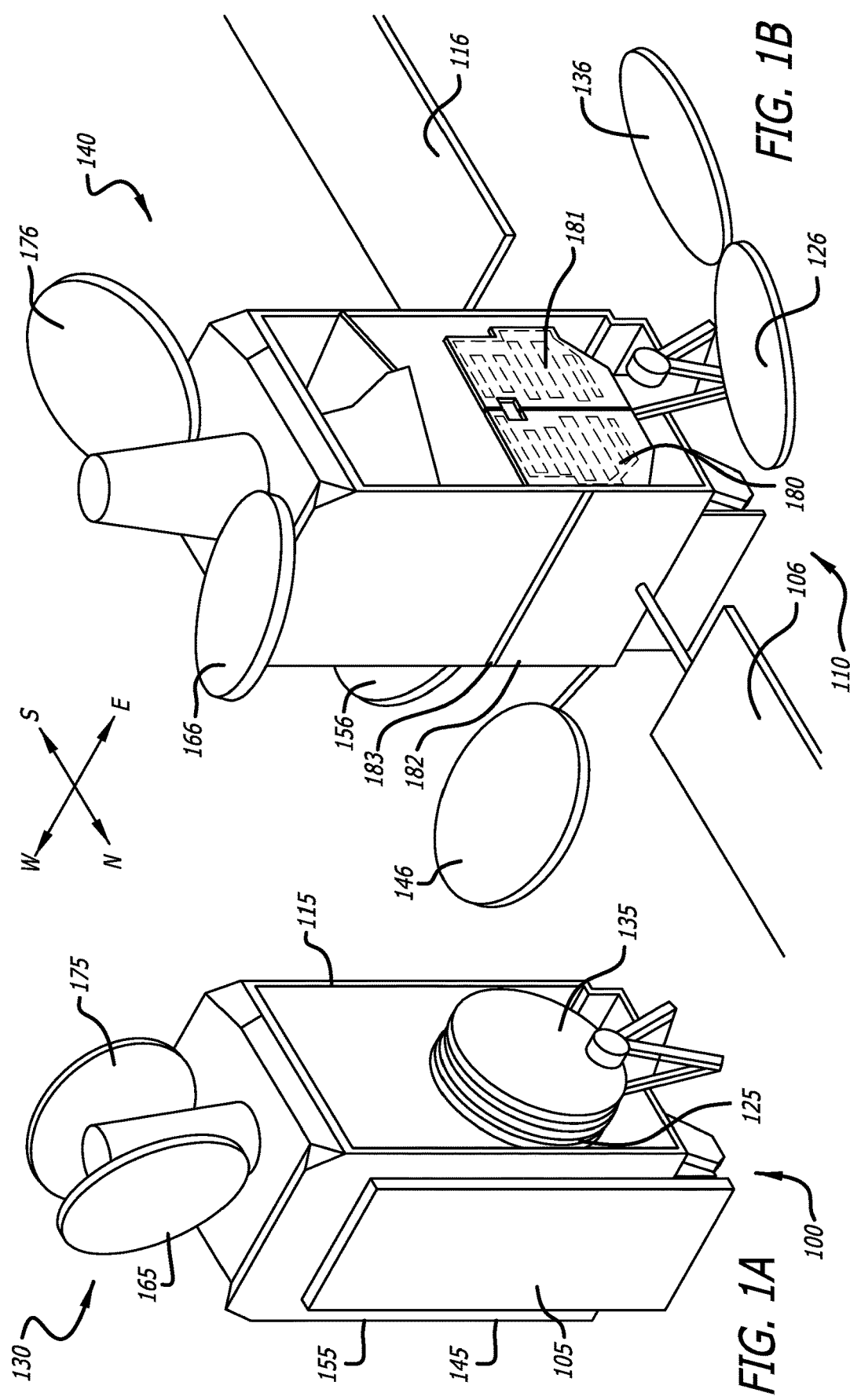

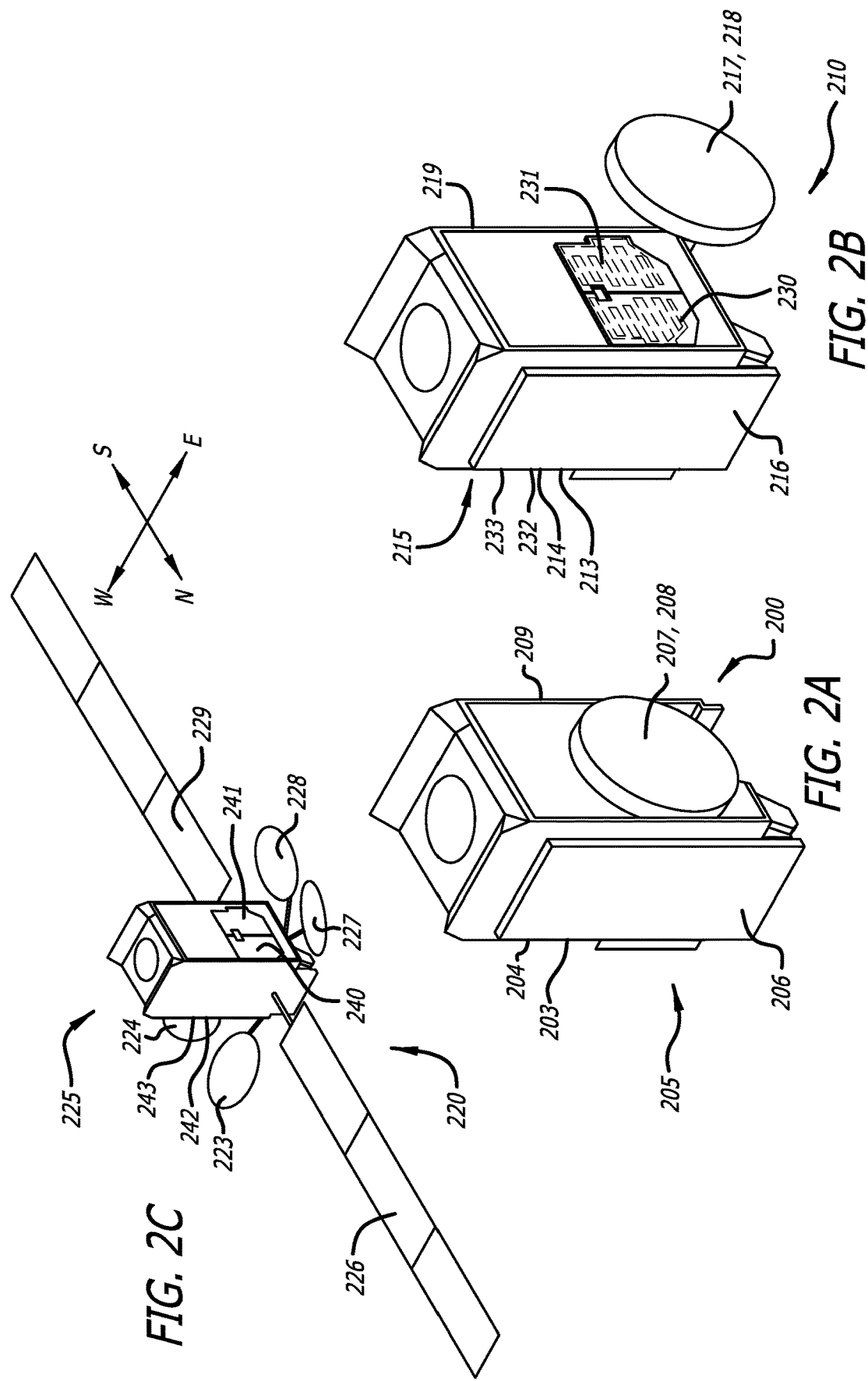

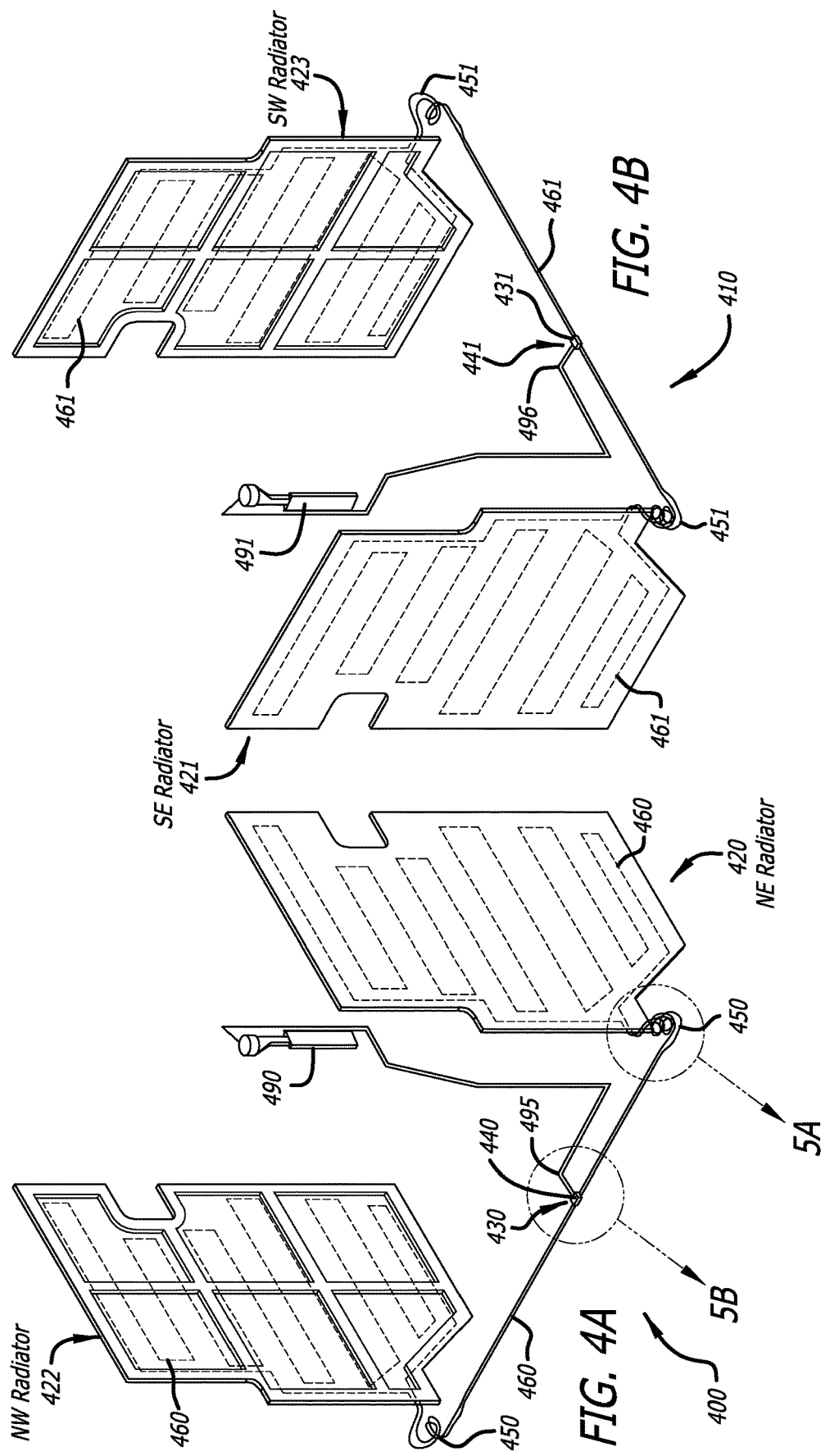

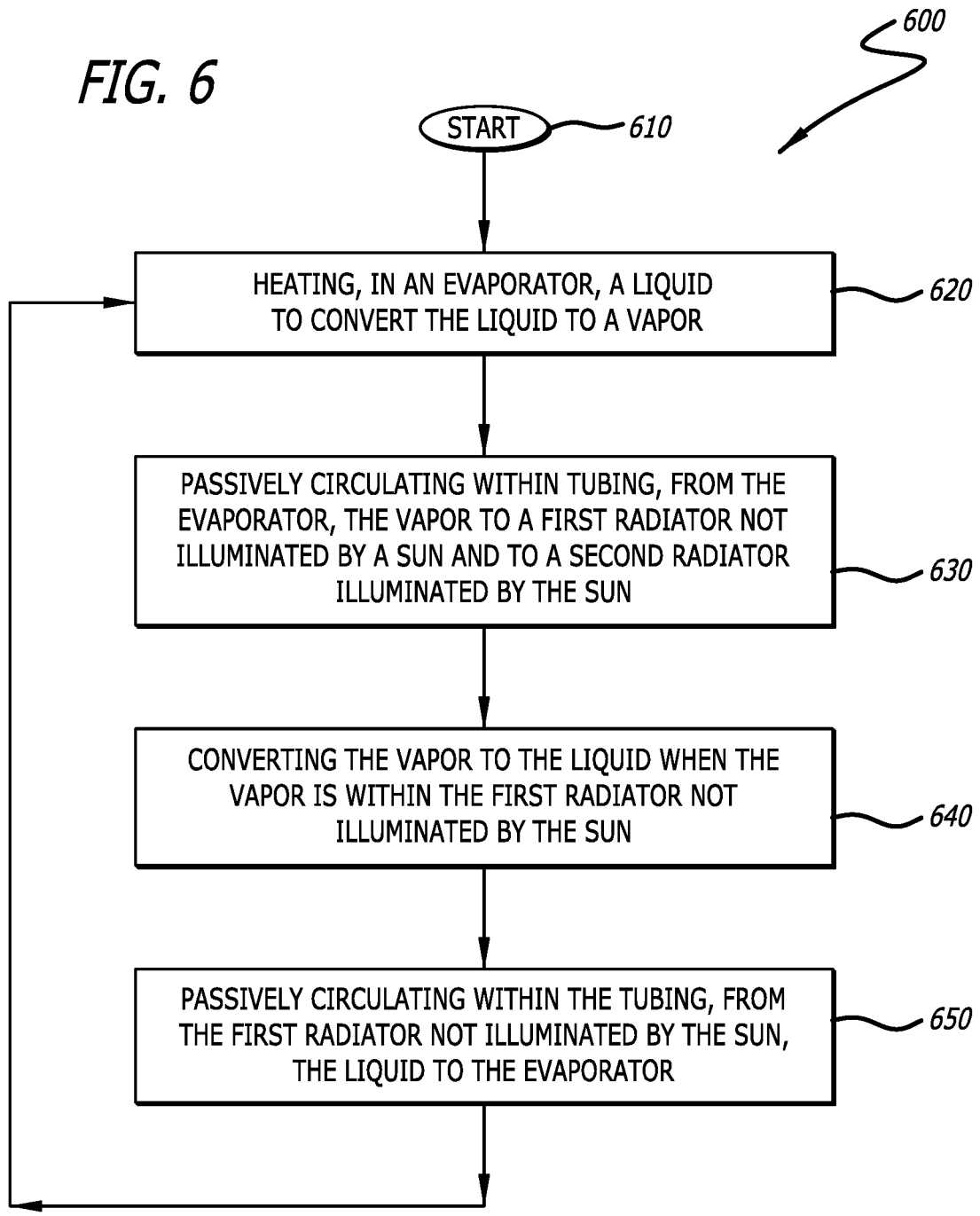

DUAL CONDENSER LOOP HEAT PIPE FOR SATELLITES WITH SUN-NORMAL RADIATORS

FIELD

The present disclosure relates to dual condenser loop heat pipes. In particular, it relates to dual condenser loop heat pipes for satellites with sun-normal radiators.

BACKGROUND

Currently, conventional systems for thermal control on spacecraft (e.g., satellites) allow for heat generated from on-board electronics to be rejected off of the north and south facing surfaces of the spacecraft. The north and south facing surfaces of the spacecraft exhibit a cooler environment than the east and west facing surfaces of the spacecraft. These conventional systems for thermal control do not allow for much heat to be rejected off of the east and west facing surfaces of the spacecraft because the sun directly illuminates them on a daily basis at a high angle of incidence. A system that also allows for heat to be rejected off of the east and west facing surfaces of the spacecraft will make the spacecraft more thermally efficient.

As such, there is a need for an improved system for thermal control that allows for heat generated from on-board electronics to be rejected off of the north and south facing surfaces of the spacecraft as well as off of the east and west facing surfaces of the spacecraft.

SUMMARY

The present disclosure relates to a method, system, and apparatus for dual condenser loop heat pipes for satellites with sun-normal radiators. In one or more embodiments, a method for a satellite thermal management system (i.e. a dual condenser loop heat pipe) comprises heating, in an evaporator, a liquid to convert the liquid to a vapor. The method further comprises passively circulating within tubing, from the evaporator, the vapor to a first radiator not illuminated by a sun and to a second radiator illuminated by the sun. Also, the method comprises converting the vapor to the liquid when the vapor is within the first radiator not illuminated by the sun. Further, the method comprises passively circulating within the tubing, from the first radiator not illuminated by the sun, the liquid to the evaporator.

In one or more embodiments, the first radiator is mounted to an east side of a satellite, and the second radiator is mounted to a west side of the satellite. In some embodiments, the first radiator is mounted to a west side of a satellite, and the second radiator is mounted to an east side of the satellite.

In at least one embodiment, the liquid is circulated within the tubing, from the first radiator not illuminated by the sun, to the evaporator via a vapor blocking tee. In some embodiments, the vapor is circulated within the tubing, from the evaporator, to the first radiator not illuminated by the sun and to the second radiator illuminated by the sun via a vapor tee.

In one or more embodiments, the liquid is a refrigerant.

In at least one embodiment, at least one portion of the tubing comprises a flexible segment. In some embodiments, the flexible segment is a flex hose.

In one or more embodiments, the evaporator is mounted within an interior of a satellite.

In at least one embodiment, the liquid is heated by heat conducting from a payload of a satellite.

In one or more embodiments, a satellite thermal management system (i.e. a dual condenser loop heat pipe) comprises an evaporator to heat a liquid to convert the liquid to a vapor. The system further comprises a first radiator not illuminated by the sun. In one or more embodiments, when the vapor is within the first radiator not illuminated by the sun, the vapor is converted to the liquid. The system also comprises a second radiator illuminated by the sun. Further, the system comprises tubing to passively circulate the vapor from the evaporator to the first radiator not illuminated by the sun and to the second radiator illuminated by the sun, and to passively circulate the liquid from the first radiator not illuminated by the sun to the evaporator. In one or more embodiments, the tubing connects the evaporator to the first radiator not illuminated by the sun and to the second radiator illuminated by the sun.

In at least one embodiment, a method of manufacturing a satellite thermal management system comprises installing south tubing in an interior of a satellite bus proximate a south facing side of the satellite bus. The method further comprises installing north tubing in the interior of the satellite bus proximate a north facing side of the satellite bus. Also, the method comprises connecting a south evaporator to the south tubing, and a north evaporator to the north tubing. In addition, the method comprises mating the satellite bus to a satellite payload to form an integrated satellite.

Additionally, the method comprises connecting a north west radiator to a north west corner of the integrated satellite, a north east radiator to a north east corner of the integrated satellite, a south west radiator to a south west corner of the integrated satellite, and a south east radiator to a south east corner of the integrated satellite. In addition, the method comprises connecting the south tubing to the south west radiator and the south east radiator. Also, the method comprises connecting the north tubing to the north west radiator and the north east radiator. In addition, the method comprises rotating the north west radiator and the south west radiator such that the north west radiator and the south west radiator both lie on a west facing side of the integrated satellite. Further, the method comprises rotating the north east radiator and the south east radiator such that the north east radiator and the south east radiator both lie on an east facing side of the integrated satellite.

In one or more embodiments, a method of installing a satellite thermal management system into an integrated satellite comprises installing a south side dual condenser loop heat pipe within an interior of a satellite bus proximate a south facing side of the satellite bus. In at least one embodiment, the south side dual condenser loop heat pipe comprises a south evaporator, a south west radiator, and a south east radiator. The method further comprises installing a north side dual condenser loop heat pipe within the interior of the satellite bus proximate a north facing side of the satellite bus. In one or more embodiments, the north side dual condenser loop heat pipe comprises a north evaporator, a north west radiator, and a north east radiator. Also, the method comprises rotating the south west radiator, the south east radiator, the north west radiator, and the north east radiator such that both faces of each of the south west radiator, the south east radiator, the north west radiator, and the north east radiator are located away from all faces of the satellite bus. In addition, the method comprises mating the satellite bus to a satellite payload to form the integrated satellite. Additionally, the method comprises connecting, during the mating of the satellite bus to the satellite payload, the south evaporator to a south side constant conductance heat pipe within the satellite payload. Also, the method comprises connecting, during the mating of the satellite bus to the satellite payload, the north evaporator to a north side constant conductance heat pipe within the satellite payload. In addition, the method comprises rotating the north west radiator and the south west radiator such that the north west radiator and the south west radiator both lie on a west facing side of the integrated satellite. Additionally, the method comprises rotating the north east radiator and the south east radiator such that the north east radiator and the south east radiator both lie on an east facing side of the integrated satellite. Also, the method comprises attaching the north west radiator and the south west radiator to the west facing side of the integrated satellite. Further, the method comprises attaching the north east radiator and the south east radiator to the east facing side of the integrated satellite.

In at least one embodiment, the south side dual condenser loop heat pipe comprises at least one portion of tubing that comprises a flexible segment. In some embodiments, the north side dual condenser loop heat pipe comprises at least one portion of tubing that comprises a flexible segment.

In one or more embodiments, the south side dual condenser loop heat pipe is pressurized with a refrigerant prior to being installed within the interior of the satellite bus. In some embodiments, the north side dual condenser loop heat pipe is pressurized with a refrigerant prior to being installed within the interior of the satellite bus.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1A is a diagram showing an exemplary satellite employing the disclosed satellite thermal management system, where the satellite is in a stowed position, in accordance with at least one embodiment of the present disclosure.

FIG. 1B is a diagram showing an exemplary satellite employing the disclosed satellite thermal management system, where the satellite is in a deployed position, in accordance with at least one embodiment of the present disclosure.

FIG. 2A is a diagram showing an exemplary satellite employing the disclosed satellite thermal management system, where the satellite is in a stowed position, in accordance with at least one embodiment of the present disclosure.

FIG. 2B is a diagram showing an exemplary satellite employing the disclosed satellite thermal management system, where the satellite is in a partially deployed position, in accordance with at least one embodiment of the present disclosure.

FIG. 2C is a diagram showing an exemplary satellite employing the disclosed satellite thermal management system, where the satellite is in a fully deployed position, in accordance with at least one embodiment of the present disclosure.

FIG. 4A is a diagram showing the west radiator (mounted on the north side of the west face of the satellite) and the east radiator (mounted on the north side of the east face of the satellite) of the disclosed satellite thermal management system (i.e. the north side dual condenser loop heat pipe), in accordance with at least one embodiment of the present disclosure.

FIG. 4B is a diagram showing the west radiator (mounted on the south side of the west face of the satellite) and the east radiator (mounted on the south side of the east face of the satellite) of the disclosed satellite thermal management system (i.e. the south side dual condenser loop heat pipe), in accordance with at least one embodiment of the present disclosure.

FIG. 6 is a diagram showing a flow chart for the disclosed method for a satellite thermal management system, in accordance with at least one embodiment of the present disclosure.

Figure 7:
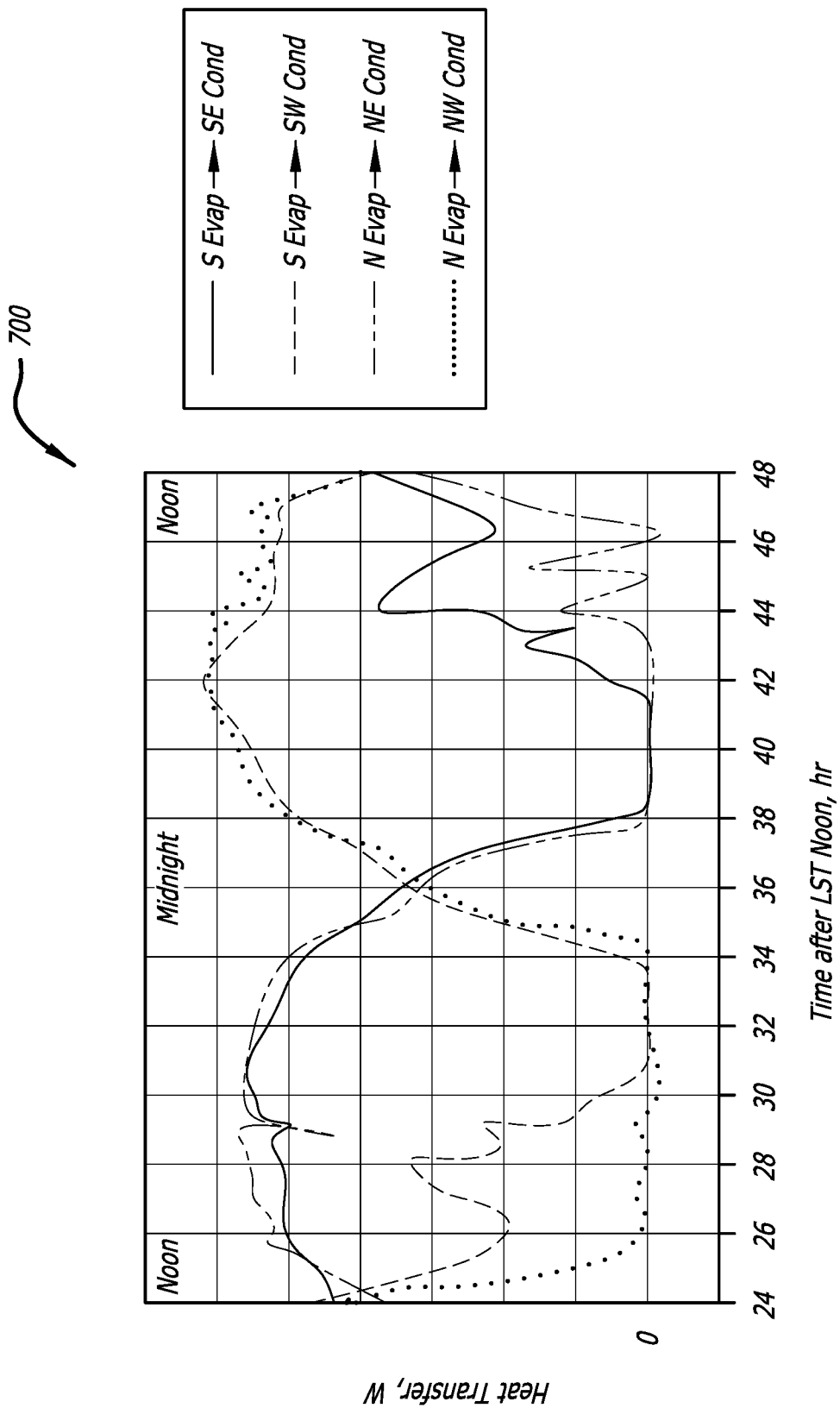

FIG. 7 is a graph 700 showing exemplary heat transfer in watts (W) for the east radiator (mounted on the north side of the east face of the satellite) (i.e. NE radiator), the west radiator (mounted on the north side of the west face of the satellite) (i.e. NW radiator), the west radiator (mounted on the south side of the west face of the satellite) (i.e. the SW radiator), and the east radiator (mounted on the south side of the east face of the satellite) (i.e. the SE radiator) over a twenty-four (24) hour period for the disclosed satellite thermal management system, in accordance with at least one embodiment of the present disclosure.

Figure 8:
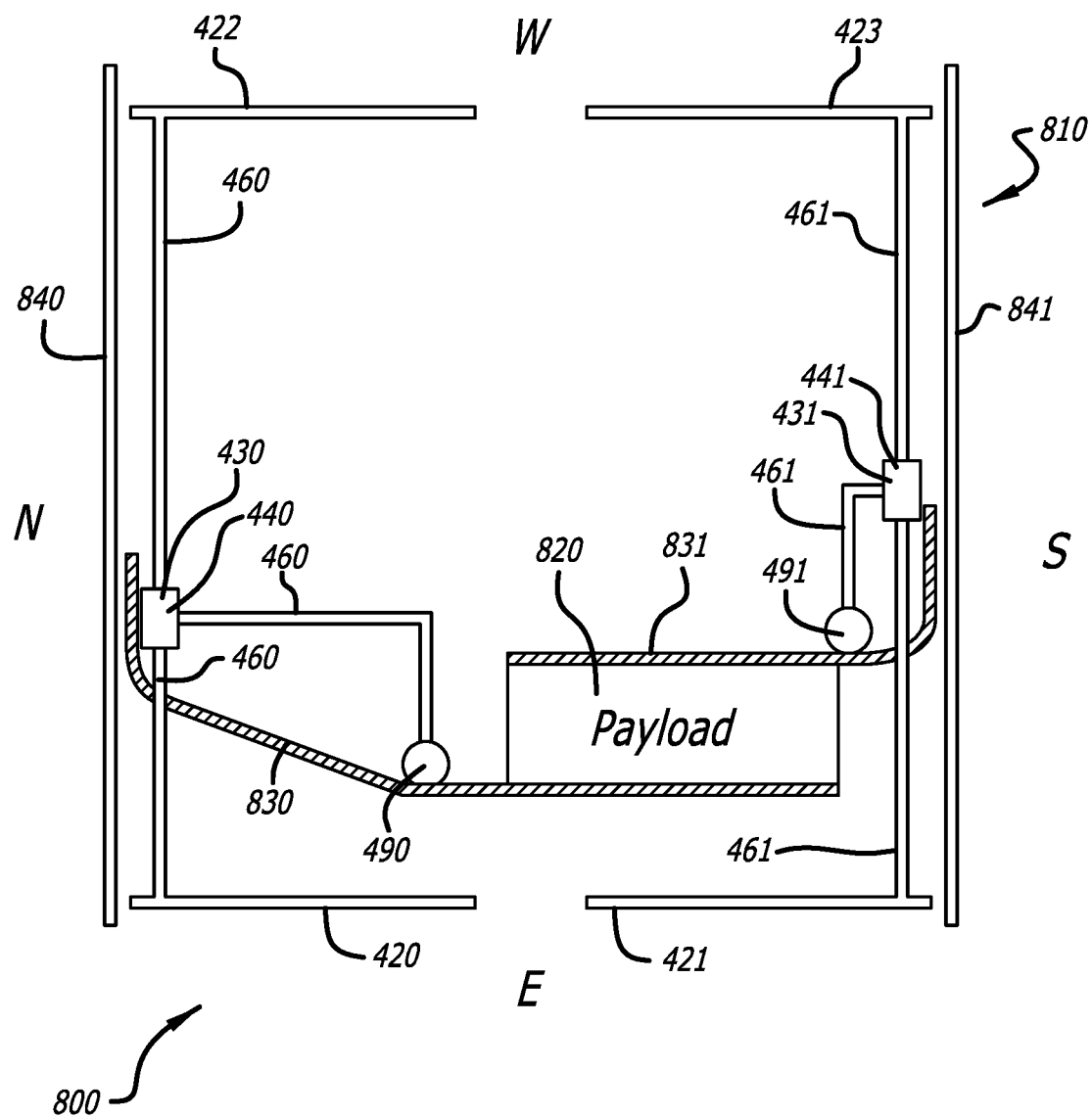

FIG. 8 is a schematic diagram showing the location of the evaporators and vapor blocking tees within the satellite in relation to the payload for the disclosed satellite thermal management system, in accordance with at least one embodiment of the present disclosure.

FIGS. 9A, 9B, 9C, and 9D together are diagrams depicting the method of installing a satellite thermal management system (i.e. a dual condenser loop heat pipe) into an exemplary integrated satellite, in accordance with at least one embodiment of the present disclosure.

Figure 10A:
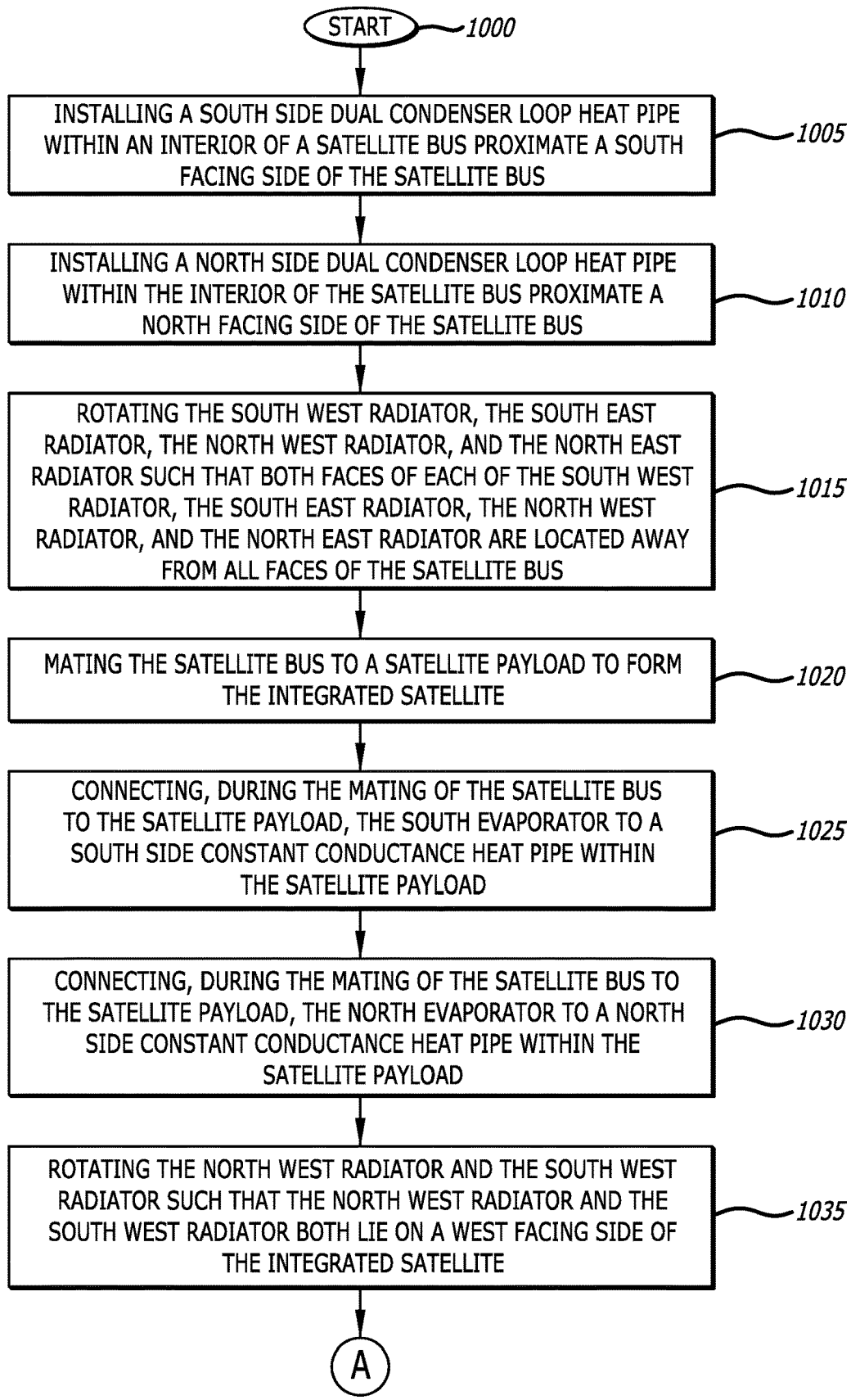
Figure 10B:
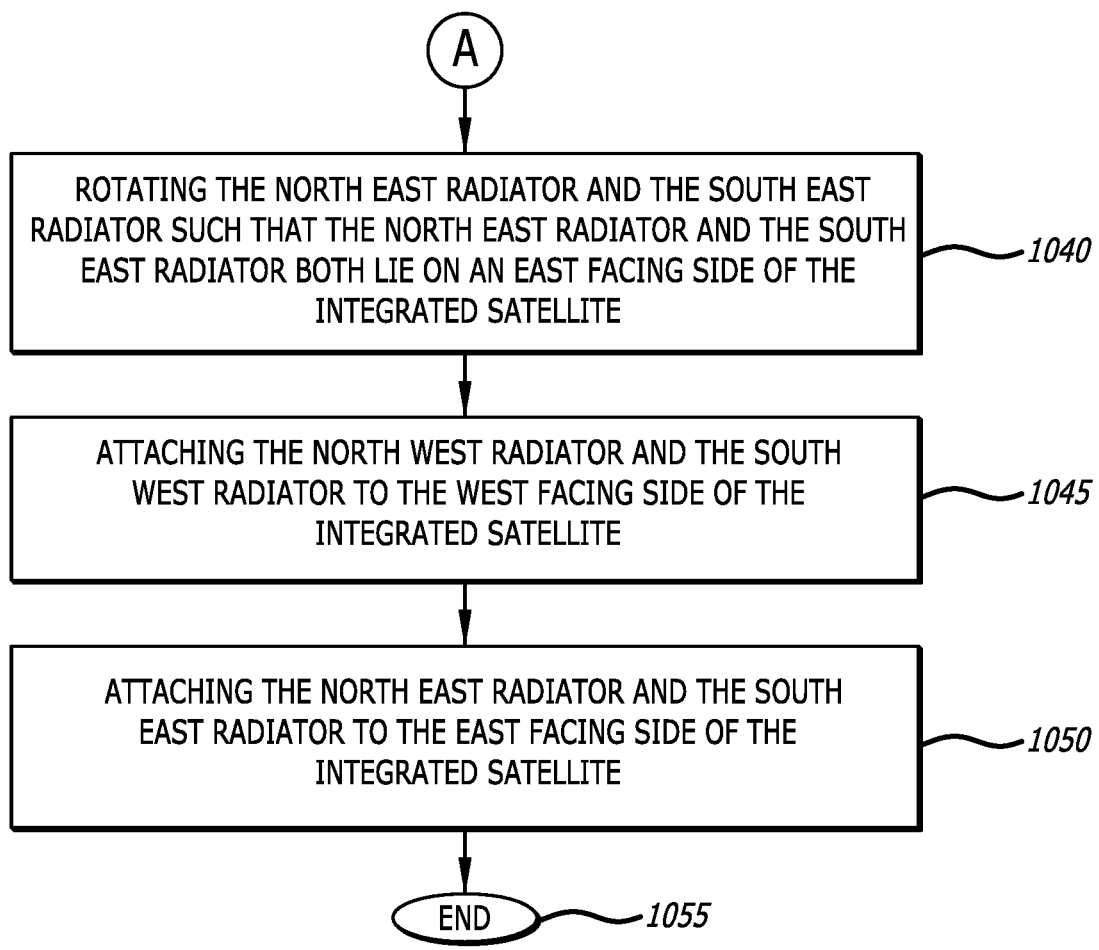

FIGS. 10A and 10B together show a flow chart for the disclosed method of installing a satellite thermal management system (i.e. a dual condenser loop heat pipe) into an exemplary integrated satellite, in accordance with at least one embodiment of the present disclosure.

DESCRIPTION

The methods and apparatus disclosed herein provide an operative system for dual condenser loop heat pipes for satellites with sun-normal radiators. The system of the present disclosure enables heat rejection off of satellite surfaces (i.e. the east and west faces) whose thermal environment is too extreme to be useful to current conventional thermal control systems for satellites. The system of the present disclosure enables satellites to reject heat with greater efficiency by utilizing the east and west surfaces of the spacecraft, thereby making the satellites more competitive in the satellite market.

The system of the present disclosure provides a thermal control technology for use on spacecraft in geosynchronous earth orbit (GEO) or other orbits, such as medium earth orbit (MEO), lower earth orbit (LEO), and super geosynchronous earth orbit (Super GEO). The disclosed system uses radiating surfaces whose external diurnal thermal environments cause these surfaces to be only minimally useful for heat rejection with the current conventional technology. The disclosed system lets these surfaces cool electronics, which require low operating temperatures and small diurnal temperature variation, by use of a fluidic switch (with no moving parts) that responds naturally to its environment. Heat is rejected from either of two radiators, whichever is cooler than the electronics. The radiators are oriented such that at least one is in a cool thermal environment at all times.

As previously mentioned above, currently, conventional systems for thermal control on spacecraft (e.g., satellites) allow for heat generated from on-board electronics to be rejected off of the north and south facing surfaces of the spacecraft. The north and south facing surfaces of the spacecraft exhibit a cooler environment than the east and west facing surfaces of the spacecraft. These conventional systems for thermal control do not allow for much heat to be rejected off of the east and west facing surfaces of the spacecraft because they are illuminated by the sun at least once per orbit. The disclosed system allows for heat to be rejected off of the east and west facing surfaces of the spacecraft, thereby making the spacecraft more thermally efficient.

The disclosed system employs dual condenser loop heat pipes on the east and west faces of a satellite. This present disclosure details the design of such a system including various design and installation options for ease of manufacturing and shipping from the vendor to the satellite manufacturer. The present disclosure provides design elements, such as: the routing of the vapor and condensate lines such that they are adjacent to one another, but thermally isolated from each other; a parallel flow condenser relative to a serial flow condenser; cross-coupling with constant conductance heat pipes to the north and south radiators to maximize heat rejection during warmest seasons and to reduce the required heater power; and heater control.

The system of the present disclosure utilizes east-west panels in combination with dual condenser loop heat pipes (with fluidic-valve-controlled segmentation of coolant flow between the two panels and with flexible portions in the tubing system) coupling the east panel and the west panel to enable assembly in the satellite vehicle. The addition of dual condenser loop heat pipes to the east and west panels enables rejection of greater payload heat loads on the vehicle. In addition, segmented parallel flow path tubing patterns within each panel enable partial operation of the east panel or west panel when the panels are partially shaded from the sun.

It should be noted that payload capacity can be limited by the cooling capacity of the vehicle's radiator panels. An increased cooling capacity allows for improved ratios of vehicle size to payload capacity (i.e. allows for smaller vehicles with a greater payload capacity).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

In addition, those skilled in the art will appreciate that embodiments of the present disclosure may be practiced in conjunction with other components, and that the system described herein is merely one example embodiment of the present disclosure.

For the sake of brevity, conventional techniques and components related to satellite thermal management systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1A is a diagram 100 showing an exemplary satellite 130 employing the disclosed satellite thermal management system, where the satellite 130 is in a stowed position, in accordance with at least one embodiment of the present disclosure. In this figure, the satellite 130 comprises a north solar panel 105, a south solar panel (out of view in figure) 115, east antenna reflectors 125, 135, west antenna reflectors (out of view in figure) 145, 155, and nadir antenna reflectors 165, 175. In this figure, the north solar panel 105, the south solar panel (out of view in figure) 115, east antenna reflectors 125, 135, west antenna reflectors (out of view in figure) 145, 155, and nadir antenna reflectors 165, 175 are all shown to be in a stowed position.

FIG. 1B is a diagram 110 showing an exemplary satellite 140 employing the disclosed satellite thermal management system, where the satellite 140 is in a deployed position, in accordance with at least one embodiment of the present disclosure. In this figure, the satellite 140 comprises a north solar panel 106, a south solar panel 116, east antenna reflectors 126, 136, west antenna reflectors 146, 156, and nadir antenna reflectors 166, 176. In this figure, the north solar panel 106, the south solar panel 116, east antenna reflectors 126, 136, west antenna reflectors 146, 156, and nadir antenna reflectors 166, 176 are all shown to be in a deployed position. In addition, the satellite 140 comprises an east radiator (mounted on the north side of the satellite 140) 180, an east radiator (mounted on the south side of the satellite 140) 181, a west radiator (mounted on the north side of the satellite 140) (out of view in figure) 182, and a west radiator (mounted on the south side of the satellite 140) (out of view in figure) 183.

FIG. 2A is a diagram 200 showing an exemplary satellite 205 employing the disclosed satellite thermal management system, where the satellite 205 is in a stowed position, in accordance with at least one embodiment of the present disclosure. In this figure, the satellite 205 comprises a north solar panel 206, a south solar panel (out of view in figure) 209, east antenna reflectors 207, 208, and west antenna reflectors (out of view in figure) 203, 204. In this figure, the north solar panel 206, the south solar panel (out of view in figure) 209, east antenna reflectors 207, 208, and west antenna reflectors (out of view in figure) 203, 204 are all shown to be in a stowed position.

FIG. 2B is a diagram 210 showing an exemplary satellite 215 employing the disclosed satellite thermal management system, where the satellite 215 is in a partially deployed position, in accordance with at least one embodiment of the present disclosure. In this figure, the satellite 215 comprises a north solar panel 216, a south solar panel (out of view in figure) 219, east antenna reflectors 217, 218, and west antenna reflectors (out of view in figure) 213, 214. In this figure, the north solar panel 216, the south solar panel (out of view in figure) 219 are shown to still be in a stowed position. Also in this figure, the east antenna reflectors 217, 218 and the west antenna reflectors 213, 214 (out of view in figure) are in a partially deployed position. In addition, the satellite comprises an east radiator (mounted on the north side of the satellite 215) 230, an east radiator (mounted on the south side of the satellite 215) 231, a west radiator (mounted on the north side of the satellite 215) (out of view in figure) 232, and a west radiator (mounted on the south side of the satellite 215) (out of view in figure) 233.

FIG. 2C is a diagram 220 showing an exemplary satellite 225 employing the disclosed satellite thermal management system, where the satellite 225 is in a fully deployed position, in accordance with at least one embodiment of the present disclosure. In this figure, the satellite 225 comprises a north solar panel 226, a south solar panel 229, east antenna reflectors 227, 228, and west antenna reflectors 223, 224. In this figure, the north solar panel 226, the south solar panel 229, east antenna reflectors 227, 228, and west antenna reflectors 223, 224 are all shown to be in a deployed position. In addition, the satellite 225 comprises an east radiator (mounted on the north side of the satellite 140) 240, an east radiator (mounted on the south side of the satellite 140) 241, a west radiator (mounted on the north side of the satellite 140) (out of view in figure) 242, and a west radiator (mounted on the south side of the satellite 140) (out of view in figure) 243.

Figure 3A:
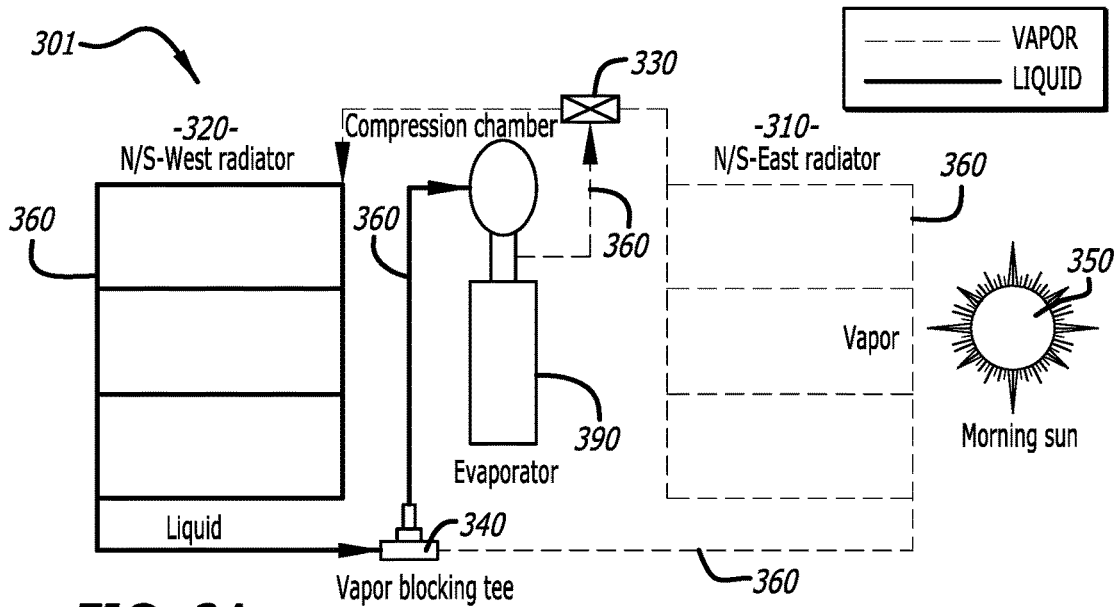
FIG. 3A is a schematic diagram showing the disclosed satellite thermal management system (i.e. a dual condenser loop heat pipe), where the east radiator is illuminated by the sun and the west radiator is not illuminated by the sun, in accordance with at least one embodiment of the present disclosure.

FIG. 3A is a schematic diagram showing the disclosed satellite thermal management system (i.e. a dual condenser loop heat pipe) 301, where the east radiator 310 is illuminated by the sun 350 and the west radiator 320 is not illuminated by the sun 350, in accordance with at least one embodiment of the present disclosure. In this figure, tubing 360 (e.g., stainless steel tubing (SST) and/or aluminum tubing) is shown to be run through the east radiator 310 and the west radiator 320. The tubing 360 connects an evaporator 390 to the east radiator 310 and to the west radiator 320. It should be noted that, in one or more embodiments, the east radiator 310 and the west radiator 320 may be mounted to the north side of the satellite; or the east radiator 310 and the west radiator 320 may be mounted to the south side of the satellite.

During operation, liquid (i.e. a heat transfer fluid) (e.g., ammonia, propylene, or other similar type of refrigerant) in the evaporator 390, which is mounted proximate heat generating electronics (e.g., a payload) of the satellite, is heated. The liquid is heated in the evaporator 390 by heat conducting from the heat generating electronics of the satellite. Once the liquid is heated, the liquid is converted to a vapor (e.g., ammonia vapor, propylene vapor, or other similar type of refrigerant vapor).

The vapor is passively circulated within tubing 360 from the evaporator 390 to the west radiator 320, which is not illuminated by the sun 350, and to the east radiator 310, which is illuminated by the sun 350 via a vapor tee 330.

When the vapor is within tubing 360 of the west radiator 320 not illuminated by the sun 350, the vapor cools and converts back to a liquid. Then, the liquid passively circulates within tubing 360 from the west radiator 320 to the evaporator 390 via a vapor blocking tee 340. Then, the process repeats.

Figure 3B:
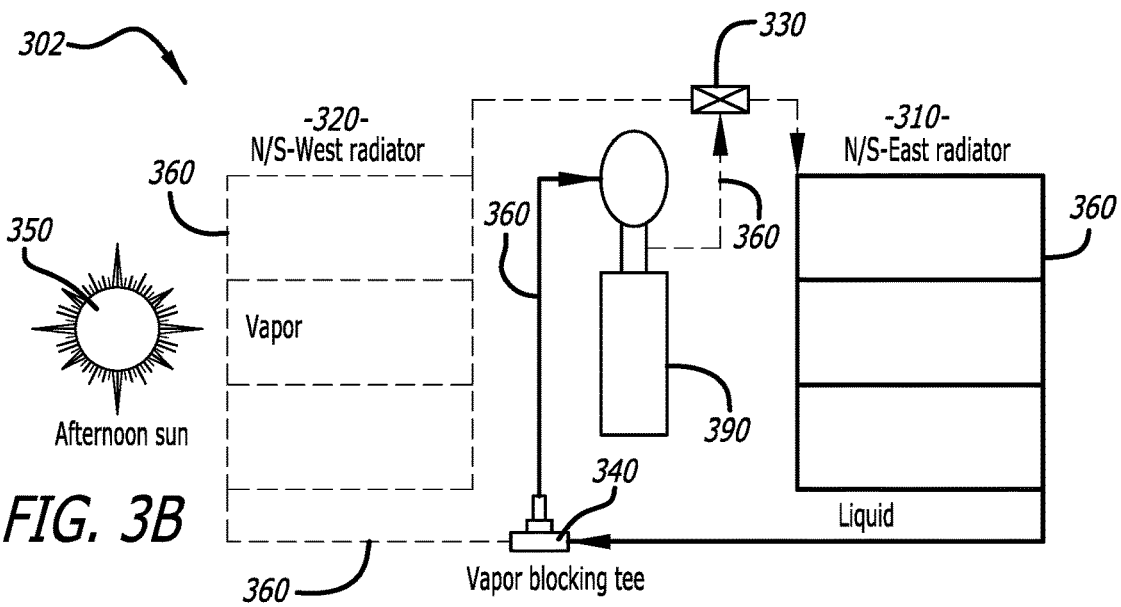
FIG. 3B is a schematic diagram showing the disclosed satellite thermal management system (i.e. a dual condenser loop heat pipe), where the west radiator is illuminated by the sun and the east radiator is not illuminated by the sun, in accordance with at least one embodiment of the present disclosure.

FIG. 3B is a schematic diagram showing the disclosed satellite thermal management system (i.e. a dual condenser loop heat pipe) 302, where the west radiator 320 is illuminated by the sun 350 and the east radiator 310 is not illuminated by the sun 350, in accordance with at least one embodiment of the present disclosure in this figure, tubing 360 (e.g., stainless steel tubing) is shown to be run through the east radiator 310 and the west radiator 320. The tubing 360 connects an evaporator 390 to the east radiator 310 and to the west radiator 320. It should be noted that, in one or more embodiments, the east radiator 310 and the west radiator 320 may be mounted to the north side of the east and west faces of the satellite; or the east radiator 310 and the west radiator 320 may be mounted to south side of the east and west faces of the satellite.

During operation, liquid (i.e. a heat transfer fluid) (e.g., ammonia, propylene, or other similar type of refrigerant) in the evaporator 390, which is mounted proximate heat generating electronics (e.g., a payload) of the satellite, is heated. The liquid is heated in the evaporator 390 by heat conducting from the heat generating electronics of the satellite. Once the liquid is heated, the liquid is converted to a vapor (e.g., ammonia vapor, propylene vapor, or other similar type of refrigerant vapor).

The vapor is passively circulated within tubing 360 from the evaporator 390 to the east radiator 310, which is not illuminated by the sun 350, and to the west radiator 320, which is illuminated by the sun 350 via a vapor tee 330.

When the vapor is within tubing 360 of the east radiator 310 not illuminated by the sun 350, the vapor cools and converts back to a liquid. Then, the liquid passively circulates within tubing 360 from the east radiator 310 to the evaporator 390 via a vapor blocking tee 340. Then, the process repeats.

Figure 3C:
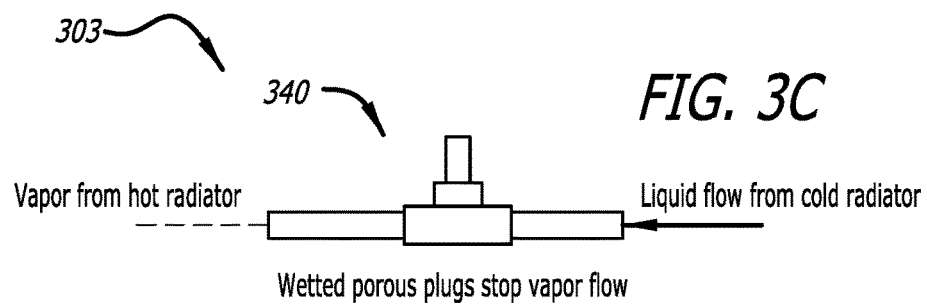
FIG. 3C is a schematic diagram showing details of an exemplary vapor blocking tee employed by the disclosed satellite thermal management system (i.e. a dual condenser loop heat pipe), in accordance with at least one embodiment of the present disclosure.

FIG. 3C is a schematic diagram 303 showing details of an exemplary vapor blocking tee 340 employed by the disclosed satellite thermal management system (i.e. a dual condenser loop heat pipe), in accordance with at least one embodiment of the present disclosure. The vapor blocking tee 340 allows liquid from the radiator not illuminated by the sun to pass through the vapor blocking tee 340. However, wetted porous plugs within the vapor blocking tee 340 do not allow the vapor from the radiator illuminated by the sun to pass through the vapor blocking tee 340.

FIG. 4A is a diagram showing the west radiator (mounted on the north side of the west face of the satellite) (i.e. NW radiator) 422 and the east radiator (mounted on the north side of the east face of the satellite) (i.e. NE radiator) 420 of the disclosed satellite thermal management system (i.e. the north side dual condenser loop heat pipe) 400, in accordance with at least one embodiment of the present disclosure. In this figure, the west radiator 422 and the east radiator 420 are shown to both have tubing (i.e. north tubing) 460 running throughout their interior. Portions of the tubing 460 comprise flexible segments (i.e. segments that are able to be bent) 450, 495. The flexible segments 450, 495 of the tubing 460, in some embodiments, comprise flex hose (e.g., corrugated tubing or braided tubing). A vapor tee 440 connects tubing 460 running from both the west radiator 422 and the east radiator 420. Also, a vapor blocking tee 430 connects tubing 460 running from both the west radiator 422 and the east radiator 420. Tubing 460 connects an evaporator (i.e. north evaporator) 490 to the vapor tee 440 and the vapor blocking tee 430.

FIG. 4B is a diagram showing the west radiator (mounted on the south side of the west face of the satellite) (i.e. the SW radiator) 423 and the east radiator (mounted on the south side of the east face of the satellite) (i.e. the SE radiator) 421 of the disclosed satellite thermal management system (i.e. the south side dual condenser loop heat pipe) 410, in accordance with at least one embodiment of the present disclosure. In this figure, the west radiator 423 and the east radiator 421 are shown to both have tubing (i.e. south tubing) 461 running throughout their interior. Portions of the tubing 461 comprise flexible segments (i.e. segments that are able to be bent) 451, 496. The flexible segments 451, 496 of the tubing 461, in some embodiments, comprise flex hose. A vapor tee 441 connects tubing 461 running from both the west radiator 423 and the east radiator 421. Also, a vapor blocking tee 431 connects tubing 461 running from both the west radiator 423 and the east radiator 421. The vapor tee 441 is thermally isolated from the vapor blocking tee 431. Tubing 461 connects an evaporator (i.e. south evaporator) 491 to the vapor tee 441 and the vapor blocking tee 431.

Figure 5A:
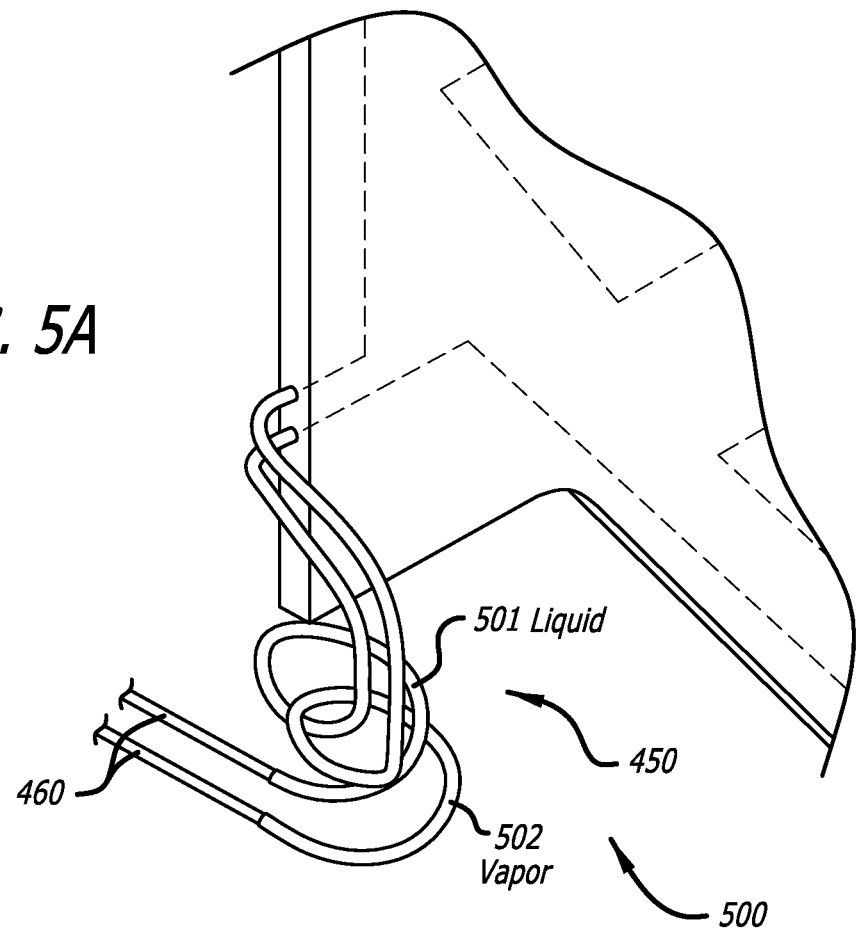
FIG. 5A is a diagram showing details of the flexible segments of the tubing as shown in FIG. 4A, in accordance with at least one embodiment of the present disclosure.

FIG. 5A is a diagram 500 showing details of the flexible segments 450, 495 of the tubing 460 as shown in FIG. 4A, in accordance with at least one embodiment of the present disclosure. Specifically, the diagram 500 shows details of the flexible segments 450 proximate the east radiator (mounted on the north side of the east face of the satellite) (i.e. NE radiator) 420. It should be noted that the flexible segments 450, 451 (refer to FIG. 4B) proximate the west radiator (mounted on the north side of the west face of the satellite) (i.e. NW radiator) 422, the west radiator (mounted on the south side of the west face of the satellite) (i.e. the SW radiator) 423, and the east radiator (mounted on the south side of the east face of the satellite) (i.e. the SE radiator) 421 are similar to the flexible segments 450 proximate the east radiator (mounted on the north side of the east face of the satellite) (i.e. NE radiator) 420 (as shown in FIG. 5A). In this figure, one flexible segment 450 is shown to be a liquid line 501, and another flexible segment 450 is shown to be a vapor line 502.

Figure 5B:
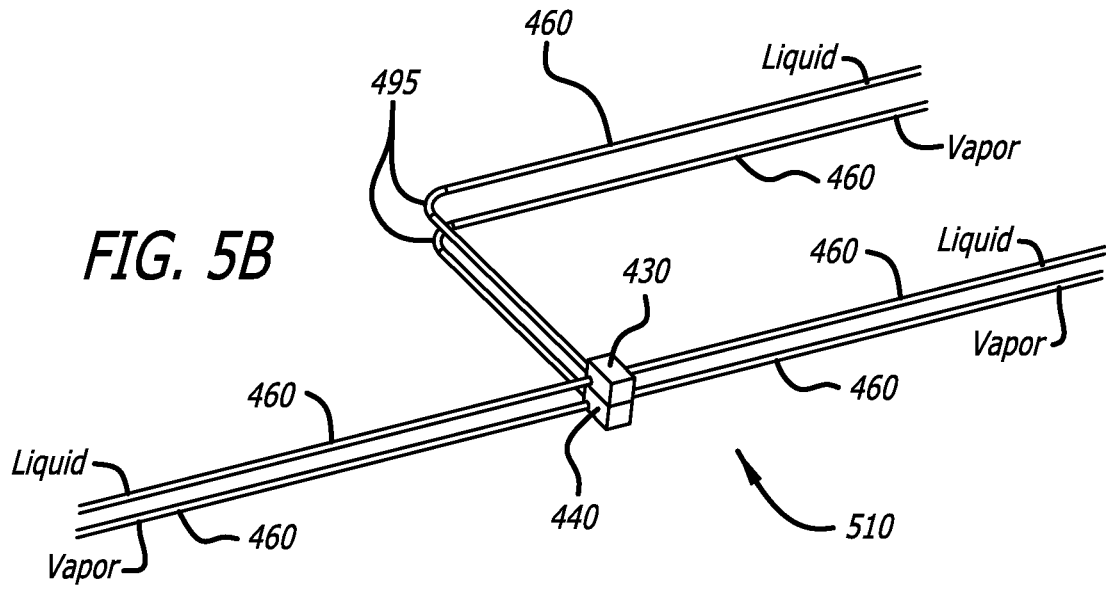
FIG. 5B is a diagram showing details of the vapor tee and the vapor blocking tee connections to the tubing as shown in FIG. 4A, in accordance with at least one embodiment of the present disclosure.

FIG. 5B is a diagram 510 showing details of the vapor tee 440 and the vapor blocking tee 430 connections to the tubing 460 and the flexible segments 495 as shown in FIG. 4A, in accordance with at least one embodiment of the present disclosure. Specifically, the diagram 510 shows details of the tubing 460 connecting to the vapor tee 440 and the vapor blocking tee 430 from the east radiator (mounted on the north side of the east face of the satellite) (i.e. NE radiator) 420 and the west radiator (mounted on the north side of the west face of the satellite) (i.e. NW radiator) 422. It should be noted that the details of the tubing 461 (refer to FIG. 4B) connecting to the vapor tee 441 and the vapor blocking tee 431 from the west radiator (mounted on the south side of the west face of the satellite) (i.e. the SW radiator) 423 and the east radiator (mounted on the south side of the east face of the satellite) (i.e. the SE radiator) 421 are similar to the details as shown in FIG. 5B.

FIG. 6 is a diagram showing a flow chart for the disclosed method 600 for a satellite thermal management system, in accordance with at least one embodiment of the present disclosure. At the start 610 of the method 600, a liquid is heated in an evaporator to convert the liquid to a vapor 620. Then, the vapor is passively circulated within tubing from the evaporator to a first radiator not illuminated by the sun and to a second radiator illuminated by the sun 630. The vapor is converted to a liquid when the vapor is within the first radiator not illuminated by the sun 640. Then, the liquid is passively circulated within the tubing from the first radiator not illuminated by the sun to the evaporator. Then, the method 600 proceeds back to the step 620 to be repeated.

FIG. 7 is a graph 700 showing exemplary heat transfer in watts (W) for the east radiator (mounted on the north side of the east face of the satellite) (i.e. NE radiator) 420 (refer to FIG. 4A), the west radiator (mounted on the north side of the west face of the satellite) (i.e. NW radiator) 422 (refer to FIG. 4A), the west radiator (mounted on the south side of the west face of the satellite) (i.e. the SW radiator) 423 (refer to FIG. 4B), and the east radiator (mounted on the south side of the east face of the satellite) (i.e. the SE radiator) 421 (refer to FIG. 4B) over a twenty-four (24) hour period for the disclosed satellite thermal management system, in accordance with at least one embodiment of the present disclosure. In this figure, on the graph 700, the x-axis represents time after local satellite time (LST) noon, in hours (hr); and the y-axis represents the amount of heat transfer in watts (W).

On the graph 700, from noon to midnight, when the sun is on the west, the majority of the heat transfer is shown to be occurring on the east radiator (mounted on the south side of the east face of the satellite) (i.e. the SE radiator) 421 and the east radiator (mounted on the north side of the east face of the satellite) (i.e. NE radiator) 420. On the graph 700, from midnight to noon, when the sun is on the east, the majority of the heat transfer is shown to be occurring on the west radiator (mounted on the south side of the west face of the satellite) (i.e. the SW radiator) 423 and the west radiator (mounted on the north side of the west face of the satellite) (i.e. NW radiator) 422.

FIG. 8 is a schematic diagram 800 showing the location of the evaporators 490, 491, vapor blocking tees 430, 431, and vapor tees 440, 441 within the satellite 810 in relation to a payload 820 (e.g., payload electronics) for the disclosed satellite thermal management system, in accordance with at least one embodiment of the present disclosure. In this figure, on the north side of the satellite 810, tubing 460 is shown to be connecting the vapor blocking tee 430 and the vapor tee 440 to the east radiator (mounted on the north side of the east face of the satellite) (i.e. NE radiator) 420 and the west radiator (mounted on the north side of the west face of the satellite) (i.e. NW radiator) 422 and the evaporator 490 (i.e. north evaporator). The vapor blocking tee 430 and the vapor tee 440 are shown to be located within the interior of the satellite 810 proximate the north side of the satellite 810. It should be noted that in this figure, the vapor blocking tee 430 and the vapor tee 440 appear to be a single unit, however they are actually two distinct separate thermally isolated units, as is shown in FIG. 5B. The evaporator 490 is shown to be mounted within the interior of the satellite 810 and proximate the payload (e.g., payload electronics) 820. A north side constant conductance heat pipe 830 is shown to be mounted proximate the payload (e.g., payload electronics) 820 and the evaporator 490. The evaporator 490 is attached (e.g. via a bolt(s)) to the north side constant conductance heat pipe 830. The north side constant conductance heat pipe 830 is oriented within the interior of the satellite 810 such that it combines the east radiator (mounted on the north side of the east face of the satellite) (i.e. NE radiator) 420 and the west radiator (mounted on the north side of the west face of the satellite) (i.e. NW radiator) 422 to the radiator(s) 840 on the north side of the satellite 810.

Similarly, on the south side of the satellite 810, tubing 461 is shown to be connecting the vapor blocking tee 431 and the vapor tee 441 to the east radiator (mounted on the south side of the east face of the satellite) (i.e. the SE radiator) 421 and the west radiator (mounted on the south side of the west face of the satellite) (i.e. the SW radiator) 423 and evaporator 491 (i.e. south evaporator). The vapor blocking tee 431 and the vapor tee 441 are shown to be located within the interior of the satellite 810 proximate the south side of the satellite 810. It should be noted that in this figure, the vapor blocking tee 431 and the vapor tee 441 appear to be a single unit, however they are actually two distinct separate thermally isolated units as is shown, for example, in FIG. 5B. The evaporator 491 is shown to be mounted within the interior of the satellite 810 and proximate the payload (e.g., payload electronics) 820. A south side constant conductance heat pipe 831 is shown to be mounted proximate the payload (e.g., payload electronics) 820 and the evaporator 491. The evaporator 491 is attached (e.g. via a bolt(s)) to the south side constant conductance heat pipe 831. The south side constant conductance heat pipe 831 is oriented within the interior of the satellite 810 such that it combines the east radiator (mounted on the south side of the east face of the satellite) (i.e. the SE radiator) 421 and the west radiator (mounted on the south side of the west face of the satellite) (i.e. the SW radiator) 423 to the radiator(s) 841 on the south side of the satellite 810.

It should be noted that the payload (e.g., payload electronics) 820 may be any sort of on-board electronics that generate heat. The payload 820 is located in between the constant conductance heat pipe 830, 831.

FIGS. 9A, 9B, 9C, and 9D together are diagrams 901, 902, 903, 904 depicting the method of installing a satellite thermal management system (i.e. a dual condenser loop heat pipe) (refer to 400 of FIG. 4A and 410 of FIG. 4B) into an exemplary integrated satellite 915, in accordance with at least one embodiment of the present disclosure.

Figure 9A:
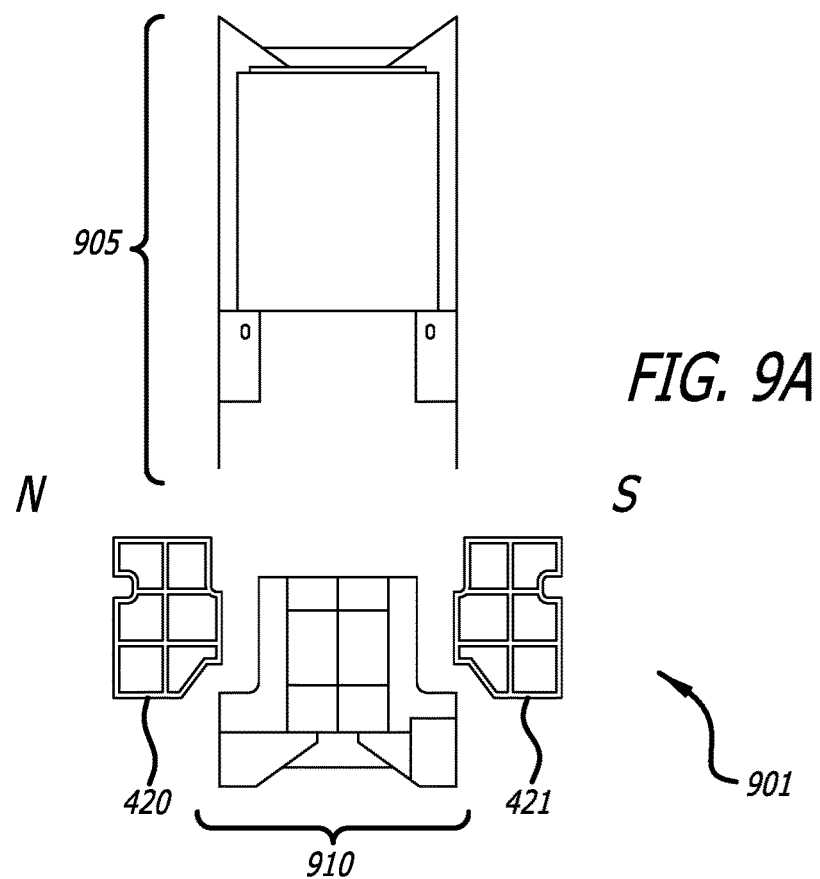
Figure 9B:
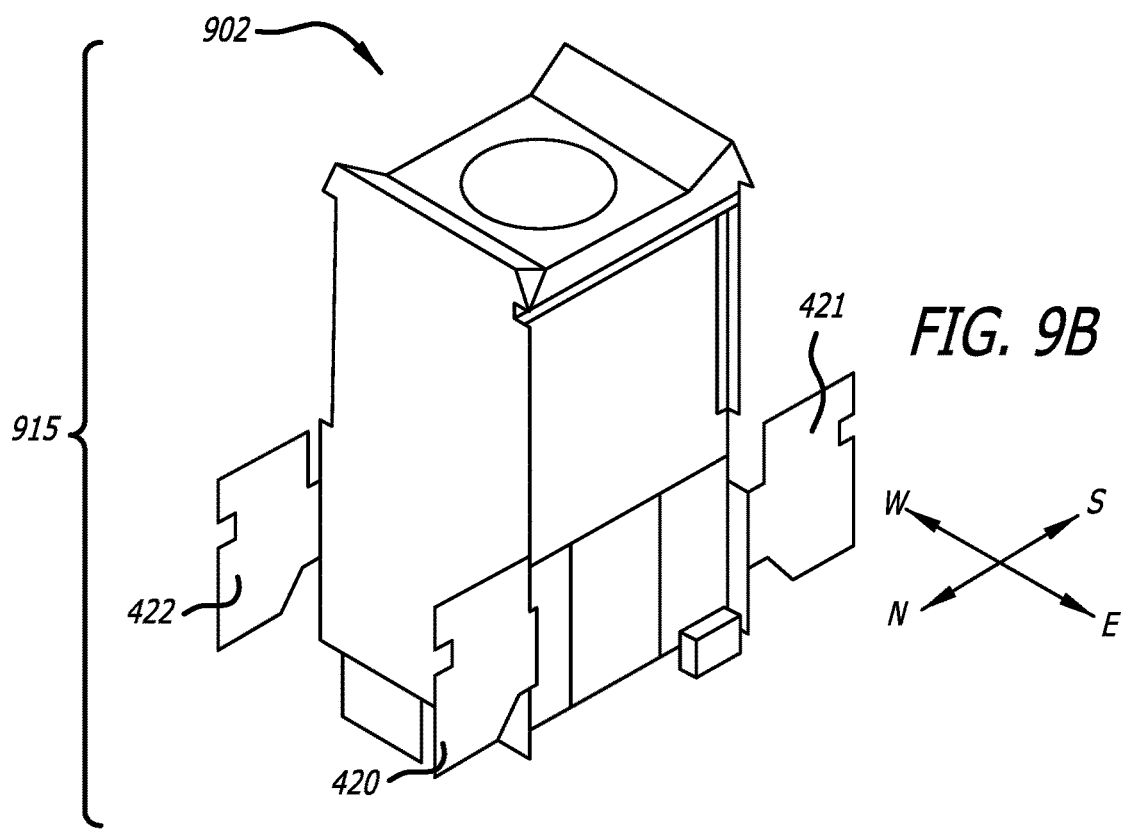

In FIG. 9A, a satellite payload 905 is shown to be mated with a satellite bus 910 to form an integrated satellite (refer to 915 of FIG. 9B). Prior to the mating of the satellite payload 905 with the satellite bus 910, a south side dual condenser loop heat pipe (refer to 410 of FIG. 4B) and a north side dual condenser loop heat pipe (refer to 400 of FIG. 4A) are each fully assembled, cleaned, charged with refrigerant, pressurized, and tested. Then, the south side dual condenser loop heat pipe (refer to 410 of FIG. 4B) is installed within an interior of the satellite bus 910 proximate the south facing side of the satellite bus 910. The south side dual condenser loop heat pipe (refer to 410 of FIG. 4B) comprises a south evaporator (refer to 491 of FIG. 4B), a south west radiator (refer to 423 of FIG. 4B), and a south east radiator 421 (also refer to 421 in FIG. 4B). It should be noted that in FIG. 9A, for the south side dual condenser loop heat pipe (refer to 410 of FIG. 4B), only the south east radiator 421 is shown. This is because the south evaporator (refer to 491 of FIG. 4B) and the south west radiator (refer to 423 of FIG. 4B) are located directly behind the south east radiator 421.

Also, the north side dual condenser loop heat pipe (refer to 400 of FIG. 4A) is installed within the interior of the satellite bus 910 proximate the north facing side of the satellite bus 910. The north side dual condenser loop heat pipe (refer to 400 of FIG. 4A) comprises a north evaporator (refer to 490 of FIG. 4A), a north west radiator (refer to 422 of FIG. 4A), and a north east radiator 420 (also refer to 420 of FIG. 4A). It should be noted that in FIG. 9A, for the north side dual condenser loop heat pipe (refer to 400 of FIG. 4A), only the north east radiator 420 is shown. This is because the north evaporator (refer to 490 of FIG. 4A) and the north west radiator (refer to 422 of FIG. 4A) are located directly behind the north east radiator 420.

Then, the south west radiator (refer to 423 of FIG. 4B), the south east radiator 421, the north west radiator (refer to 422 of FIG. 4A), and the north east radiator 420 are rotated such that both faces of each of the south west radiator (refer to 423 of FIG. 4B), the south east radiator 421, the north west radiator (refer to 422 of FIG. 4A), and the north east radiator 420 are located away from all faces of the satellite bus 910 (e.g., as shown in FIG. 9A, the faces of the north east radiator 420 and the north east radiator 420 are located away from the faces of the satellite bus 910. It should be noted that the portions of the tubing 460 (refer to FIG. 4A) that comprise flexible segments (i.e. segments that are able to be bent) 450 allow for the rotation of the north west radiator (refer to 422 of FIG. 4A) and the north east radiator 420. Also, the portions of the tubing 461 (refer to FIG. 4B) that comprise flexible segments (i.e. segments that are able to be bent) 451 allow for the rotation of the south west radiator (refer to 423 of FIG. 4B) and the south east radiator 421.

Then, after the south west radiator (refer to 423 of FIG. 4B), the south east radiator 421, the north west radiator (refer to 422 of FIG. 4A), and the north east radiator 420 are rotated accordingly, the satellite payload 905 is mated to the satellite bus 910 to form the integrated satellite (refer to 915 of FIG. 9B). It should be noted that during the mating of the satellite payload 905 to the satellite bus 910, the south evaporator (refer to 491 of FIG. 8) is positioned proximate to a south side constant conductance heat pipe (refer to 831 of FIG. 8) within the satellite payload 905. It should be noted that the portions of the tubing 461 (refer to FIG. 4B) that comprise flexible segments (i.e. segments that are able to be bent) 496 (refer to FIG. 4B) allow for the positioning of the south evaporator (refer to 491 of FIG. 8) to be proximate to the south side constant conductance heat pipe (refer to 831 of FIG. 8). After the south evaporator (refer to 491 of FIG. 8) is positioned proximate to the south side constant conductance heat pipe (refer to 831 of FIG. 8), the south evaporator (refer to 491 of FIG. 8) is connected (e.g., via a bolt(s)) to the south side constant conductance heat pipe (refer to 831 of FIG. 8) within the satellite payload 905.

Additionally, it should be noted that during the mating of the satellite payload 905 to the satellite bus 910, the north evaporator (refer to 490 of FIG. 8) is positioned proximate to a north side constant conductance heat pipe (refer to 830 of FIG. 8) within the satellite payload 905. It should be noted that the portions of the tubing 460 (refer to FIG. 4A) that comprise flexible segments (i.e. segments that are able to be bent) 495 (refer to FIG. 4A) allow for the positioning of the north evaporator (refer to 490 of FIG. 8) to be proximate to the north side constant conductance heat pipe (refer to 830 of FIG. 8). After the north evaporator (refer to 490 of FIG. 8) is positioned proximate to the north side constant conductance heat pipe (refer to 830 of FIG. 8), the north evaporator (refer to 490 of FIG. 8) is connected (e.g., via a bolt(s)) to the north side constant conductance heat pipe (refer to 830 of FIG. 8) within the satellite payload 905.

FIG. 9B shows the satellite payload 905 mated to the satellite bus 910 to form the integrated satellite 915.

Figure 9C:
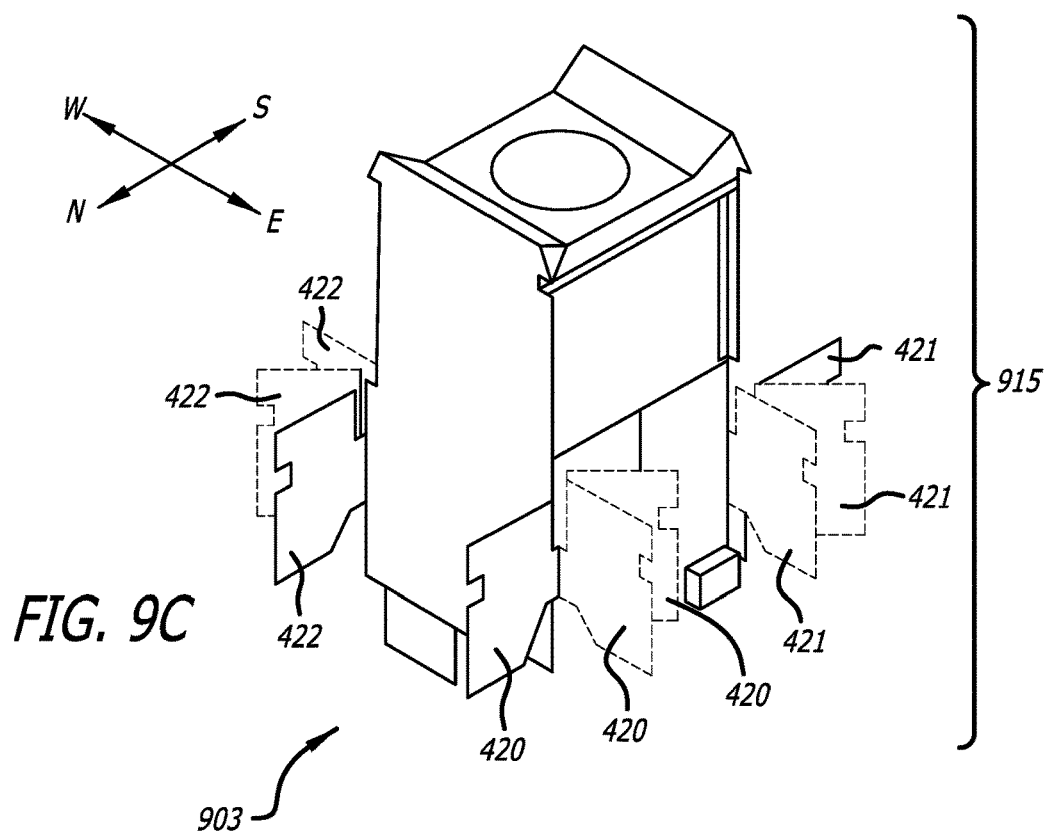
Figure 9D:
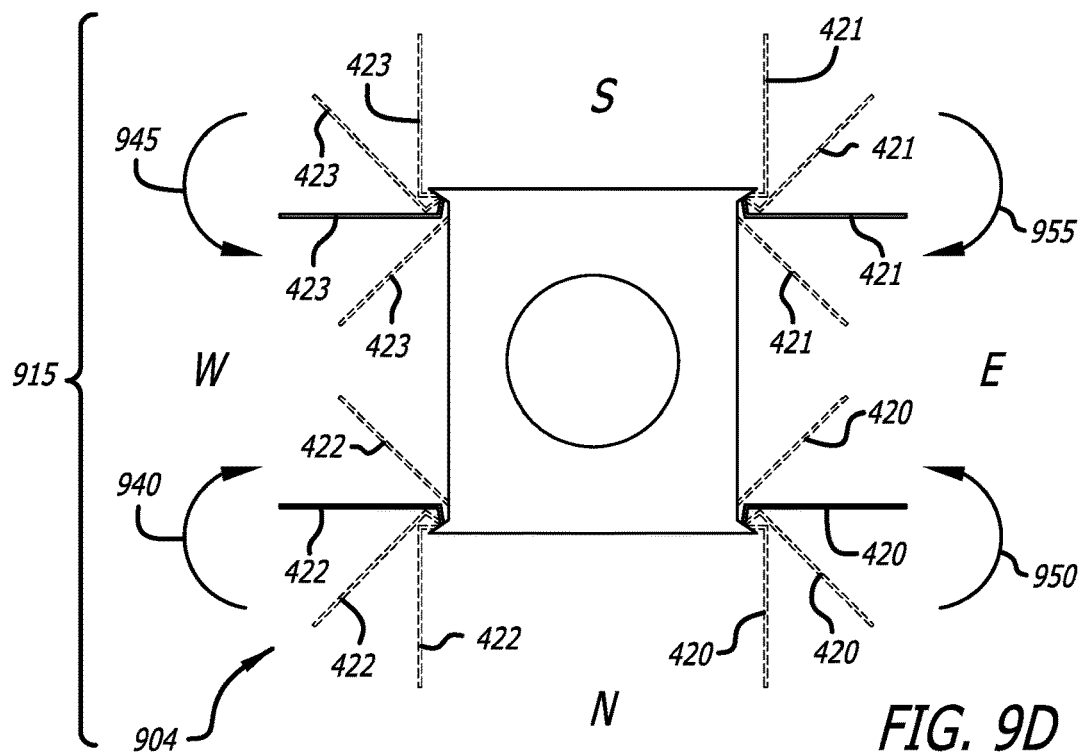

In FIGS. 9C and 9D, after the satellite payload 905 has been mated to the satellite bus 910, the north west radiator 422 and the south west radiator 423 are rotated such that the north west radiator 422 and the south west radiator 423 both lie on a west facing side of the integrated satellite 915. Also, after the satellite payload 905 has been mated to the satellite bus 910, the north east radiator 420 and the south east radiator 421 are rotated such that the north east radiator 420 and the south east radiator 421 both lie on an east facing side of the integrated satellite 915.

Then, the north west radiator 422 and the south west radiator 423 are attached (e.g., via a bolt(s)) to the west facing side of the integrated satellite 915. Also, the north east radiator 420 and the south east radiator 421 are attached (e.g., via a bolt(s)) to the east facing side of the integrated satellite 915.

FIGS. 10A and 10B together show a flow chart for the disclosed method of installing a satellite thermal management system (i.e. a dual condenser loop heat pipe) into an exemplary integrated satellite, in accordance with at least one embodiment of the present disclosure. At the start 1000 of the method, a south side dual condenser loop heat pipe is installed within an interior of a satellite bus proximate a south facing side of the satellite bus 1005. In one or more embodiments, the south side dual condenser loop heat pipe comprises a south evaporator, a south west radiator, and a south east radiator. Also, a north side dual condenser loop heat pipe is installed within an interior of a satellite bus proximate a north facing side of the satellite bus 1010. In some embodiments, the north side dual condenser loop heat pipe comprises a north evaporator, a north west radiator, and a north east radiator.

Then, the south west radiator, the south east radiator, the north west radiator, and the north east radiator are rotated such that both faces of each of the south west radiator, the south east radiator, the north west radiator, and the north east radiator are located away from all faces of the satellite bus 1015. The satellite bus is then mated to a satellite payload to form the integrated satellite 1020. During the mating of the satellite bus to the satellite payload, the south evaporator is connected to a south side constant conductance heat pipe within the satellite payload 1025. Also, during the mating of the satellite bus to the satellite payload, the north evaporator is connected to a north side constant conductance heat pipe within the satellite payload 1030.

Then, the north west radiator and the south west radiator are rotated such that the north west radiator and the south west radiator both lie on a west facing side of the integrated satellite 1035. Also, the north east radiator and the south east radiator are rotated such that the north east radiator and the south east radiator both lie on an east facing side of the integrated satellite 1040. Then, the north west radiator and the south west radiator are both attached to the west facing side of the integrated satellite 1045. Also, the north east radiator and the south east radiator are both attached to the east facing side of the integrated satellite 1050. Then, the method ends 1055.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for a satellite thermal management system, the method comprising:
    heating, in an evaporator, a liquid to convert the liquid to a vapor;
    passively circulating within tubing, from the evaporator, the vapor to a first radiator not illuminated by a sun and to a second radiator illuminated by the sun;
    converting the vapor to the liquid when the vapor is within the first radiator not illuminated by the sun; and
    passively circulating within the tubing, from the first radiator not illuminated by the sun, the liquid to the evaporator,
    wherein the liquid is circulated within the tubing, from the first radiator not illuminated by the sun, to the evaporator via a vapor blocking tee.

2. The method of claim 1, wherein the first radiator is mounted to an east side of a satellite, and the second radiator is mounted to a west side of the satellite.

3. The method of claim 1, wherein the first radiator is mounted to a west side of a satellite, and the second radiator is mounted to an east side of the satellite.

4. The method of claim 1, wherein the vapor is circulated within the tubing, from the evaporator, to the first radiator not illuminated by the sun and to the second radiator illuminated by the sun via a vapor tee.

5. The method of claim 1, wherein the liquid is a refrigerant.

6. The method of claim 1, wherein at least one portion of the tubing comprises a flexible segment.

7. The method of claim 6, wherein the flexible segment is a flex hose.

8. The method of claim 1, wherein the evaporator is mounted within an interior of a satellite.

9. The method of claim 1, wherein the liquid is heated by heat conducting from a payload of a satellite.

10. The method of claim 1, wherein the vapor blocking tee is connected to the first radiator, the second radiator, and the evaporator via the tubing.

11. A satellite thermal management system, the system comprising:
    an evaporator configured to heat a liquid to thereby convert the liquid to a vapor;
    a first radiator configured such that, when the first radiator is not illuminated by the sun, the vapor within the first radiator is converted to the liquid;
    a second radiator; and
    tubing connecting the evaporator to the first radiator and to the second radiator,
    wherein when the first radiator is not illuminated by the sun and the second radiator is illuminated by the sun, the tubing is configured to passively circulate the vapor from the evaporator to the first radiator and to the second radiator, and to passively circulate the liquid from the first radiator to the evaporator, and wherein the system is configured to circulate the liquid within the tubing from the first radiator to the evaporator via a vapor blocking tee.

12. The system of claim 11, wherein the first radiator is mounted to an east side of a satellite, and the second radiator is mounted to a west side of the satellite.

13. The system of claim 11, wherein the first radiator is mounted to a west side of a satellite, and the second radiator is mounted to an east side of the satellite.

14. The system of claim 11, wherein the system is configured to circulate the vapor within the tubing from the evaporator to the first radiator and to the second radiator via a vapor tee.

15. The system of claim 11, wherein the liquid is a refrigerant.

16. The system of claim 11, wherein at least one portion of the tubing comprises a flexible segment.

17. The system of claim 16, wherein the flexible segment is a flex hose.

18. The system of claim 11, wherein the evaporator is mounted within an interior of a satellite.

19. The system of claim 11, wherein the system is configured to heat the liquid by heat conducting from a payload of a satellite.

20. The system of claim 11, wherein the vapor blocking tee is connected to the first radiator, the second radiator, and the evaporator via the tubing.

\* \* \* \* \*